US006862719B2

(12) United States Patent
Embling et al.

(10) Patent No.: US 6,862,719 B2
(45) Date of Patent: Mar. 1, 2005

(54) INTELLIGENT POWER PACK ASSISTED PEDESTAL TUNING FOR ELECTRONIC ARTICLE SURVEILLANCE

(75) Inventors: Steven Embling, Pompano Beach, FL (US); Michael A. Zampini, Boca Raton, FL (US); William Jeffreys, Boynton Beach, FL (US); Thomas Frederick, Coconut Creek, FL (US); Ronald Alterio, Delray Beach, FL (US); Fadi E. Ayoub, Boca Raton, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 511 days.

(21) Appl. No.: 10/108,205

(22) Filed: Mar. 26, 2002

(65) Prior Publication Data

US 2002/0157070 A1 Oct. 24, 2002

Related U.S. Application Data

(60) Provisional application No. 60/278,806, filed on Mar. 26, 2001.

(51) Int. Cl.[7] ............................ G06F 17/50; G06F 9/45

(52) U.S. Cl. .................................... 716/5; 716/2; 716/4

(58) Field of Search ................................. 716/1–2, 4–5; 340/572.1, 572.5, 572.7, 700 R, 745, 748

(56) References Cited

U.S. PATENT DOCUMENTS

| | | | | | |
|---|---|---|---|---|---|
| 4,700,179 | A | * | 10/1987 | Fancher | 340/572.2 |
| 5,586,042 | A | | 12/1996 | Pisau et al. | 364/482 |
| 5,796,180 | A | * | 8/1998 | Glehr | 340/10.34 |
| 5,901,063 | A | | 5/1999 | Chang et al. | 364/488 |
| 5,903,469 | A | | 5/1999 | Ho | 364/489 |
| 5,953,642 | A | * | 9/1999 | Feldtkeller et al. | 455/195.1 |
| 6,070,803 | A | * | 6/2000 | Stobbe | 235/492 |
| 6,195,630 | B1 | | 2/2001 | Mauskar et al. | 703/18 |
| 6,351,215 | B2 | * | 2/2002 | Rodgers et al. | 340/572.1 |
| 6,385,565 | B1 | | 5/2002 | Anderson et al. | 703/18 |

FOREIGN PATENT DOCUMENTS

EP 0 404 150 A * 12/1990

* cited by examiner

*Primary Examiner*—Matthew Smith
*Assistant Examiner*—Paul Dinh

(57) ABSTRACT

Automatic tuning of an EAS antenna pedestal without the use of special tools or advanced training is provided. The capacitance of the antenna circuit is adjusted to tune the resonant frequency to the desired frequency. Measurement of the current level is used to validate that the antenna is resonant at the desired frequency. If the current level indicates that the antenna is not resonant at the specified frequency, LEDs located on a capacitor tuning board light to indicate where jumpers should be placed to add or remove capacitance from the circuit. Alternately, the capacitance values can be electronically added or removed from the circuit.

12 Claims, 5 Drawing Sheets

41 42 43

| Cap nF | Jumpers IN (pos 1-2) | |
|---|---|---|
| | JW1-7 | JW8-14 |
| 6.81 | none | none |
| 6.85 | 7 | 14 |
| 6.89 | 6 | 13 |
| 6.93 | 6,7 | 13,14 |
| 6.98 | 5 | 12 |
| 7.02 | 5,7 | 12,14 |
| 7.07 | 5,6 | 12,13 |
| 7.11 | 5,6,7 | 12,13,14 |
| 7.16 | 4 | 11 |
| 7.21 | 4,7 | 11,14 |
| 7.26 | 4,6 | 11,13 |
| 7.3 | 4,6,7 | 11,13,14 |
| 7.35 | 4,5 | 11,12 |
| 7.41 | 4,5,7 | 11,12,14 |
| 7.46 | 4,5,6 | 11,12,13 |
| 7.5 | 4 to 7 | 11 to 14 |
| 7.56 | 3 | 10 |
| 7.62 | 3,7 | 10,14 |
| 7.67 | 3,6 | 10,13 |
| 7.72 | 3,6,7 | 10,13,14 |
| 7.77 | 3,5 | 10,12 |
| 7.83 | 3,5,7 | 10,12,14 |
| 7.89 | 3,5,6 | 10,12,13 |
| 7.94 | 3,5,6,7 | 10,12,13,14 |
| 8.01 | 3,4 | 10,11 |
| 8.07 | 3,4,7 | 10,11,14 |
| 8.13 | 3,4,6 | 10,11,13 |
| 8.18 | 3,4,6,7 | 10,11,13,14 |
| 8.25 | 3,4,5 | 10,11,12 |
| 8.31 | 3,4,5,7 | 10,11,12,14 |
| 8.38 | 3 to 6 | 10 to 13 |
| 8.43 | 3 to 7 | 10 to 14 |
| 8.53 | 2 | 9 |
| 8.6 | 2,7 | 9,14 |
| 8.67 | 2,6 | 9,13 |
| 8.73 | 2,6,7 | 9,13,14 |
| 8.8 | 2,5 | 9,12 |
| 8.87 | 2,5,7 | 9,12,14 |
| 8.95 | 2,5,6 | 9,12,13 |
| 9.01 | 2,5,6,7 | 9,12,13,14 |
| 9.1 | 2,4 | 9,11 |
| 9.18 | 2,4,7 | 9,11,14 |

41 42 43

| Cap nF | Jumpers IN (pos 1-2) | |
|---|---|---|
| | JW1-7 | JW8-14 |
| 9.26 | 2,4,6 | 9,11,13 |
| 9.32 | 2,4,6,7 | 9,11,13,14 |
| 9.41 | 2,4,5 | 9,11,12 |
| 9.49 | 2,4,5,7 | 9,11,12,14 |
| 9.58 | 2,4,5,6 | 9,11,12,13 |
| 9.65 | 2,4,5,6,7 | 9,11,12,13,14 |
| 9.75 | 2,3 | 9,10 |
| 9.85 | 2,3,7 | 9,10,14 |
| 9.94 | 2,3,6 | 9,10,13 |
| 10.01 | 2,3,6,7 | 9,10,13,14 |
| 10.11 | 2,3,5 | 9,10,12 |
| 10.21 | 2,3,5,7 | 9,10,12,14 |
| 10.31 | 2,3,5,6 | 9,10,12,13 |
| 10.38 | 2,3,5,6,7 | 9,10,12,13,14 |
| 10.51 | 2,3,4 | 9,10,11 |
| 10.61 | 2,3,4,7 | 9,10,11,14 |
| 10.72 | 2,3,4,6 | 9,10,11,13 |
| 10.8 | 2,3,4,6,7 | 9,10,11,13,14 |
| 10.92 | 2,3,4,5 | 9 to 12 |
| 11.04 | 2,3,4,5,7 | 9,10,11,12,14 |
| 11.15 | 2 to 6 | 9 to 13 |
| 11.24 | 2 to 7 | 9 to 14 |
| 11.34 | 1,3 | 8,10 |
| 11.47 | 1,3,7 | 8,10,14 |
| 11.59 | 1,3,6 | 8,10,13 |
| 11.69 | 1,3,6,7 | 8,10,13,14 |
| 11.82 | 1,3,5 | 8,10,12 |
| 11.96 | 1,3,5,7 | 8,10,12,14 |
| 12.09 | 1,3,5,6 | 8,10,12,13 |
| 12.2 | 1,3,5,6,7 | 8,10,12,13,14 |
| 12.37 | 1,3,4 | 8,10,11 |
| 12.52 | 1,3,4,7 | 8,10,11,14 |
| 12.67 | 1,3,4,6 | 8,10,11,13 |
| 12.79 | 1,3,4,6,7 | 8,10,11,13,14 |
| 12.95 | 1,3,4,5 | 8,10,11,12 |
| 13.11 | 1,3,4,5,7 | 8,10,11,12,14 |
| 13.27 | 1,3,4,5,6 | 8,10,11,12,13 |
| 13.4 | 1,3,4,5,6,7 | 8,10,11,12,13,14 |
| 13.67 | 1,2 | 8,9 |

41 42 43

| Cap nF | Jumpers IN (pos 1-2) | |
|---|---|---|
| | JW1-7 | JW8-14 |
| 13.85 | 1,2,7 | 8,9,14 |
| 14.03 | 1,2,6 | 8,9,13 |
| 14.17 | 1,2,6,7 | 8,9,13,14 |
| 14.37 | 1,2,5 | 8,9,12 |
| 14.57 | 1,2,5,7 | 8,9,12,14 |
| 14.77 | 1,2,5,6 | 8,9,12,13 |
| 14.93 | 1,2,5,6,7 | 8,9,12,13,14 |
| 15.19 | 1,2,4 | 8,9,11 |
| 15.42 | 1,2,4,7 | 8,9,11,14 |
| 15.64 | 1,2,4,6 | 8,9,11,13 |
| 15.82 | 1,2,4,6,7 | 8,9,11,13,14 |
| 16.07 | 1,2,4,5 | 8,9,11,12 |
| 16.32 | 1,2,4,5,7 | 8,9,11,12,14 |
| 16.57 | 1,2,4,5,6 | 8,9,11,12,13 |
| 16.78 | 1,2,4,5,6,7 | 8,9,11,12,13,14 |
| 17.1 | 1,2,3 | 8,9,10 |
| 17.39 | 1,2,3,7 | 8,9,10,14 |
| 17.67 | 1,2,3,6 | 8,9,10,13 |
| 17.9 | 1,2,3,6,7 | 8,9,10,13,14 |
| 18.22 | 1,2,3,5 | 8,9,10,12 |
| 18.55 | 1,2,3,5,7 | 8,9,10,12,14 |
| 18.87 | 1,2,3,5,6 | 8,9,10,12,13 |
| 19.14 | 1,2,3,5,6,7 | 8,9,10,12,13,14 |
| 19.56 | 1,2,3,4 | 8 to 11 |
| 19.94 | 1,2,3,4,7 | 8,9,10,11,14 |
| 20.31 | 1,2,3,4,6 | 8,9,10,11,13 |
| 20.62 | 1,2,3,4,6,7 | 8,9,10,11,13,14 |
| 21.04 | 1 to 5 | 8 to 12 |
| 21.47 | 1,2,3,4,5,7 | 8,9,10,11,12,14 |
| 21.91 | 1 to 6 | 8 to 13 |
| 22.27 | 1 to 7 | 8 to 14 |

FIG. 3

INTELLIGENT POWER PACK ASSISTED PEDESTAL TUNING FOR ELECTRONIC ARTICLE SURVEILLANCE

CROSS REFERENCES TO RELATED APPLICATIONS

This application claims the benefit of U.S. Provisional Application No. 60/278,806, filed Mar. 26, 2001.

STATEMENT REGARDING FEDERALLY SPONSORED RESEARCH OR DEVELOPMENT

Not Applicable

BACKGROUND OF THE INVENTION

1. Field of the Invention

This application relates to electronic article surveillance systems, and more particularly to automated tuning of an electronic article surveillance antenna pedestal.

2. Description of the Related Art

Electronic article surveillance (EAS) systems are used to reduce theft of articles from a protected area, such as a retail store. The EAS system transmits an electromagnetic signal to establish an interrogation zone, which is typically located at the store's exits. An EAS tag adapted to respond to the transmitted signal when in the interrogation zone is attached to each article to be protected. The EAS system's receiver detects the EAS tag response. EAS tags attached to articles that have been purchased or are authorized for removal are removed or deactivated prior to the article passing through the interrogation zone. Therefore, the detection of an EAS tag within the interrogation zone indicates that an article is being removed without authorization, and appropriate action can be taken, such as setting off an alarm to warn personnel.

In EAS system installation, the installed antenna must resonate at the desired transmit frequency to transmit the maximum amount of energy into the interrogation zone. The antenna is connected to a pedestal, which contains matching capacitors and electronics, and both are connected to a power pack containing system electronics. The antenna is tuned according to the formula $f_0=½π(LC)^{1/2}$, where the capacitance is adjusted to tune the antenna to the resonant frequency. For example, pulsed magnetomechanical EAS systems, such as the FLOOR*MAX and PRO*MAX systems sold by Sensormatic Electronics Corporation, are tuned to about 58 kHz. Tuning is accomplished manually by a trained technician using an oscilloscope and other test equipment. The following is a typical tuning procedure:

1.—Connect an oscilloscope with a current probe to the transmitter antenna coil.

2.—Turn on the power pack and measure the current for both the top and bottom coils.

3.—Note the current amplitude readings.

4.—Turn off the power pack

5.—Guess if more or less capacitance in needed.

6.—Look up a jumper setting in the table and place the jumper settings accordingly.

7.—Set the jumper as specified onto the PC board

8.—Turn on the power pack and measure the current

9.—Note if the current increased or decreased.

10.—If the current increased the guess at step 5 was correct. If the current decreased the guess was incorrect and the jumper settings where wrong.

11.—Note the current amplitude readings for the top and bottom coils.

12.—Is the current maximized? If not got to step 4. If the current is maximized go to the next antenna.

The above process is very time consuming and prone to errors as well as requiring expensive tools and specialized training. A more efficient, less expensive technique for antenna tuning is desired.

BRIEF SUMMARY OF THE INVENTION

The present invention is a method and system for automatically selecting the proper matching capacitance for maximizing power transfer into an electronic article surveillance antenna and includes: getting a plurality of capacitance values associated with an antenna pedestal; selecting an initial capacitor value from the capacitor values associated with the antenna pedestal; measuring a current at a preselected number of frequencies near a preselected operating frequency to obtain a current maximum for the antenna pedestal, if said current maximum is at said preselected operating frequency then stop, the antenna pedestal is tuned; otherwise, calculating a new capacitance value from the capacitor values associated with the antenna pedestal to tune the antenna pedestal; and, selecting the new capacitor value and jumping to the current measuring step to repeat the process until the current maximum occurs at the preselected operating frequency.

Selecting the initial and new capacitor values from the capacitor values associated with the antenna pedestal can include lighting an LED associated with a jumper setting on a capacitor tuning printed circuit board to manually select the capacitor value used in the current measuring step.

Selecting the initial and new capacitor values from the capacitor values associated with the antenna pedestal can include electronically selecting the initial and new capacitor values for the current measuring step.

Selecting the initial and new capacitor values from the capacitor values associated with the antenna pedestal includes displaying the initial and new capacitor values for the current measuring step on a remote device such as a portable computer or the like.

When calculating a new capacitance value from the capacitor values associated with the antenna pedestal to tune the antenna pedestal the following formula can be used:

$$C2=C1(F1/F2)^2,$$

where C2 is the new capacitor value;

C1 is the capacitor value from the last calculation;

F1 is the peak frequency found in the preselected number of frequencies;

F2 is the preselected desired operating frequency.

The method and system can further include determining if the antenna pedestal is a first type or a second type and getting the plurality of capacitance values associated with the first type or second type antenna pedestal, accordingly.

Objectives, advantages, and applications of the present invention will be made apparent by the following detailed description of embodiments of the invention.

BRIEF DESCRIPTION OF THE SEVERAL VIEWS OF THE DRAWINGS

FIG. 3 is one embodiment for a capacitor/LED lookup table.

DETAILED DESCRIPTION OF THE INVENTION

The present invention permits tuning of an EAS antenna pedestal without the use of special tools or advanced training. The antennas are resonant at some frequency, according to the resonance formula: $f_0=\frac{1}{2}\pi(LC)^{1/2}$. Capacitance "C" is adjusted to tune the resonant frequency $f_0$ to the desired frequency, such as 58 kHz for example. The power pack takes a measurement of the current to validate that the antenna is resonant at the desired frequency. If the antenna is not resonant at the specified frequency, LEDs located on the capacitor tuning printed circuit board (PCB) light to indicate where jumpers should be placed to add or remove capacitance from the circuit.

Figure 1:
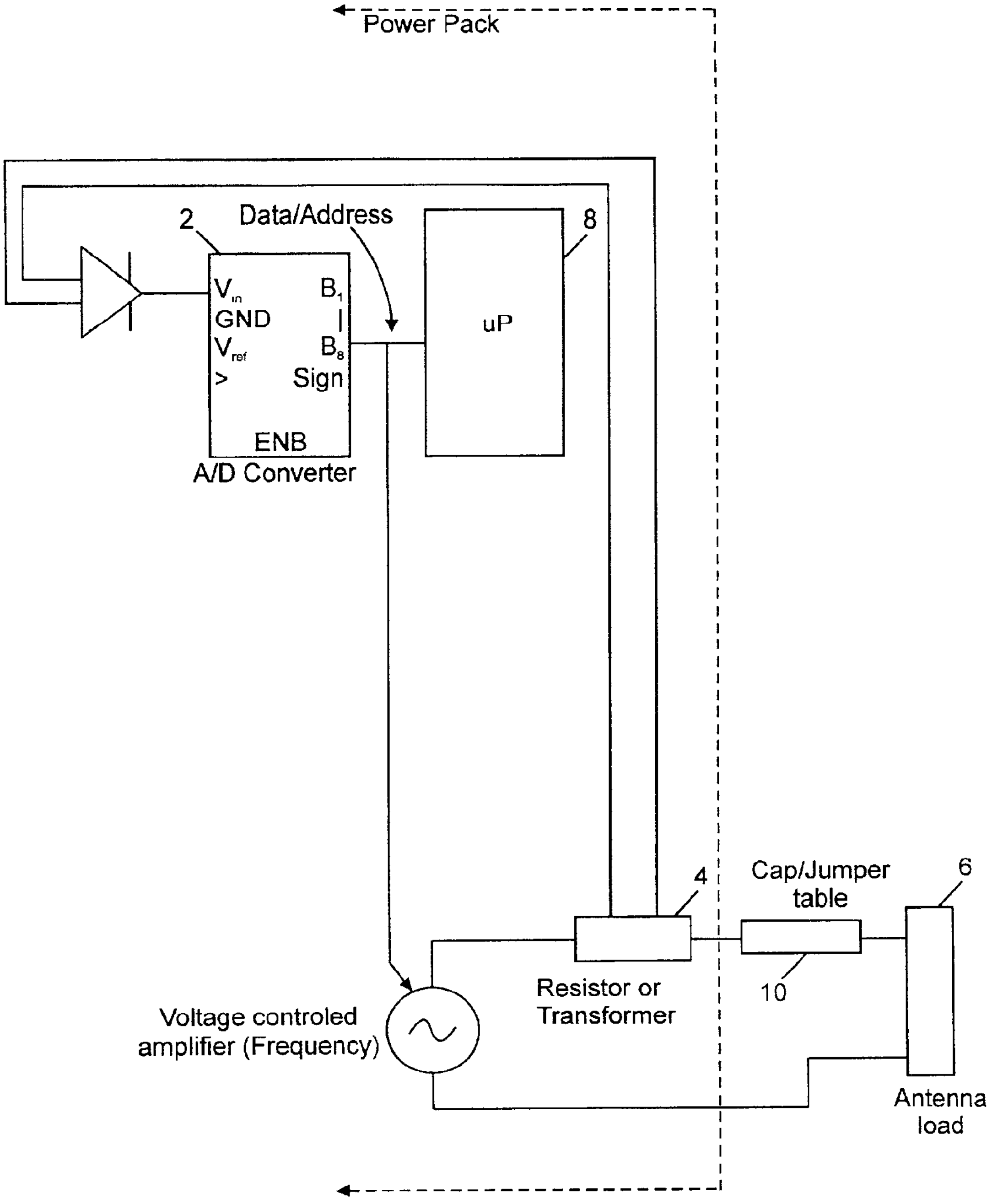
FIG. 1 is a block diagram of one embodiment of the hardware for the present invention.

Referring to FIG. 1, analog to digital (A/D) converter 2 measures the voltage across a resistor or transformer 4 in series with the antenna. Given the known impedance of the resistor or transformer 4, the current can then be calculated by microprocessor 8, and the appropriate capacitor LEDs can be displayed on the capacitor tuning PCB 10. An installer then places jumper wires according to the LEDs to add or subtract capacitance, and the test is repeated until the antenna is tuned, as fully described below.

Figure 2A:
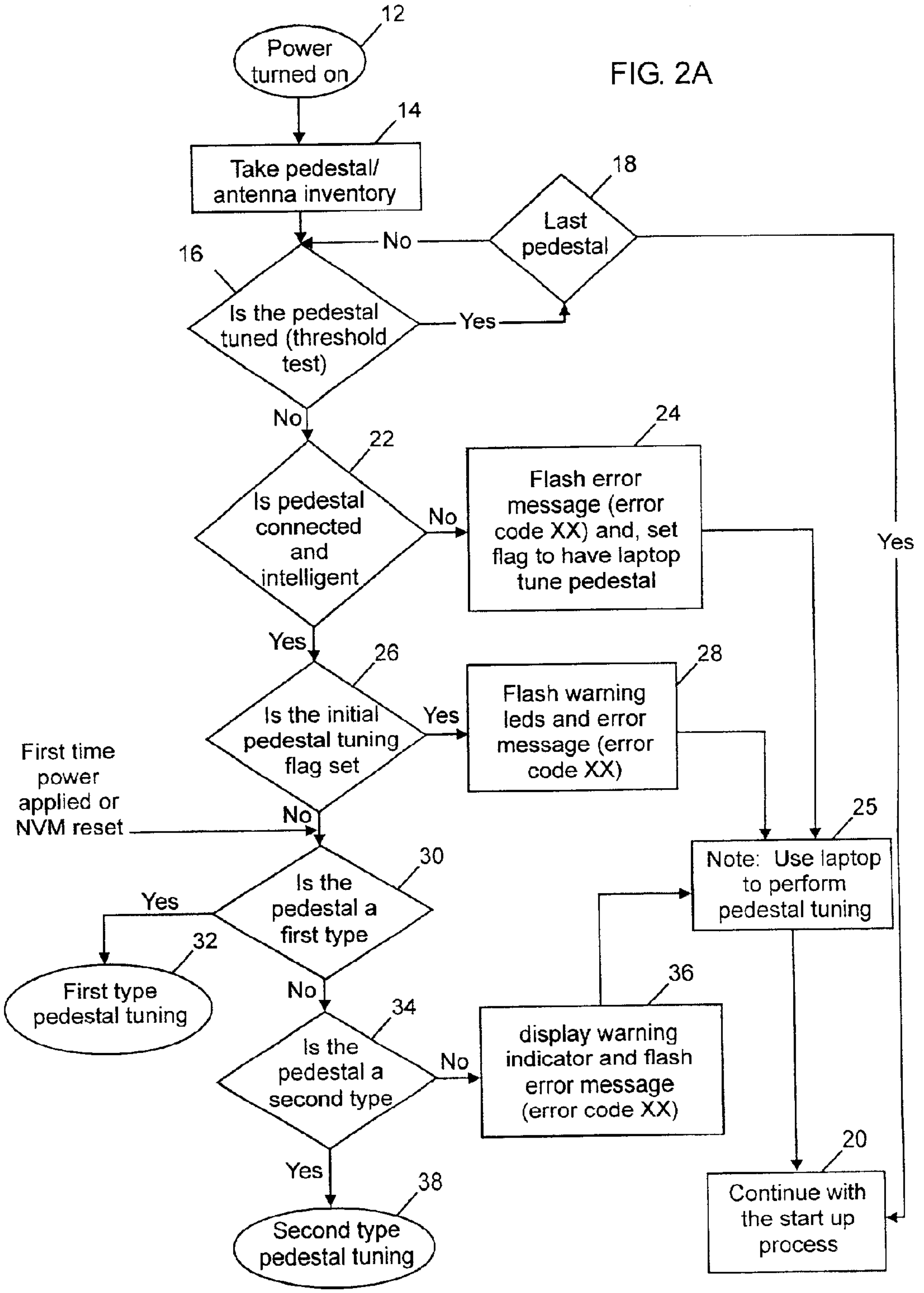
FIGS. 2A and 2B is a flow diagram of one embodiment of the present invention.

Referring to FIG. 2A, once the antenna pedestal and power pack are interconnected, power is turned on at 12. An antenna and pedestal inventory is first performed at 14 to determine how many pedestals are connected to the power pack. If the pedestal is tuned at 16, and it is the last pedestal at 18, then no further tuning is required and the system continues with the start up sequence at 20. A pedestal is considered tuned when the antenna is resonating at the desired frequency and with sufficient current. If the pedestal is not tuned at 16, but is not intelligent at 22, an error message is generated at 24 and external tuning is necessary at 25. An intelligent pedestal means one that is adapted to be automatically tuned according to the present invention and is compatible with the power pack. If the pedestal is intelligent at 22, and this is not the first time the pedestal has been tuned as indicated by an "initial tuning" flag set at 26, a warning code is generated at 28 and external tuning is necessary at 25. If this is the initial pedestal tuning as indicated by the initial tuning flag not being set at 26, and if this is a first type of pedestal at 30, the system will proceed with the tuning process for a first type of antenna pedestal at 32. If the pedestal is not a first type of pedestal at 30 and not a second type of pedestal at 34, and error message is generated at 36 and external tuning is necessary at 36. Alternately, additional antenna pedestal types can be included herein, with two being used in the present example, which could be PRO*MAX and FLOOR*MAX, respectively. More or less than two can be implemented in like manner and are contemplated by the present invention. If the pedestal is second type at 34, the system will proceed with the tuning process for a second type of antenna pedestal at 38.

Figure 2B:
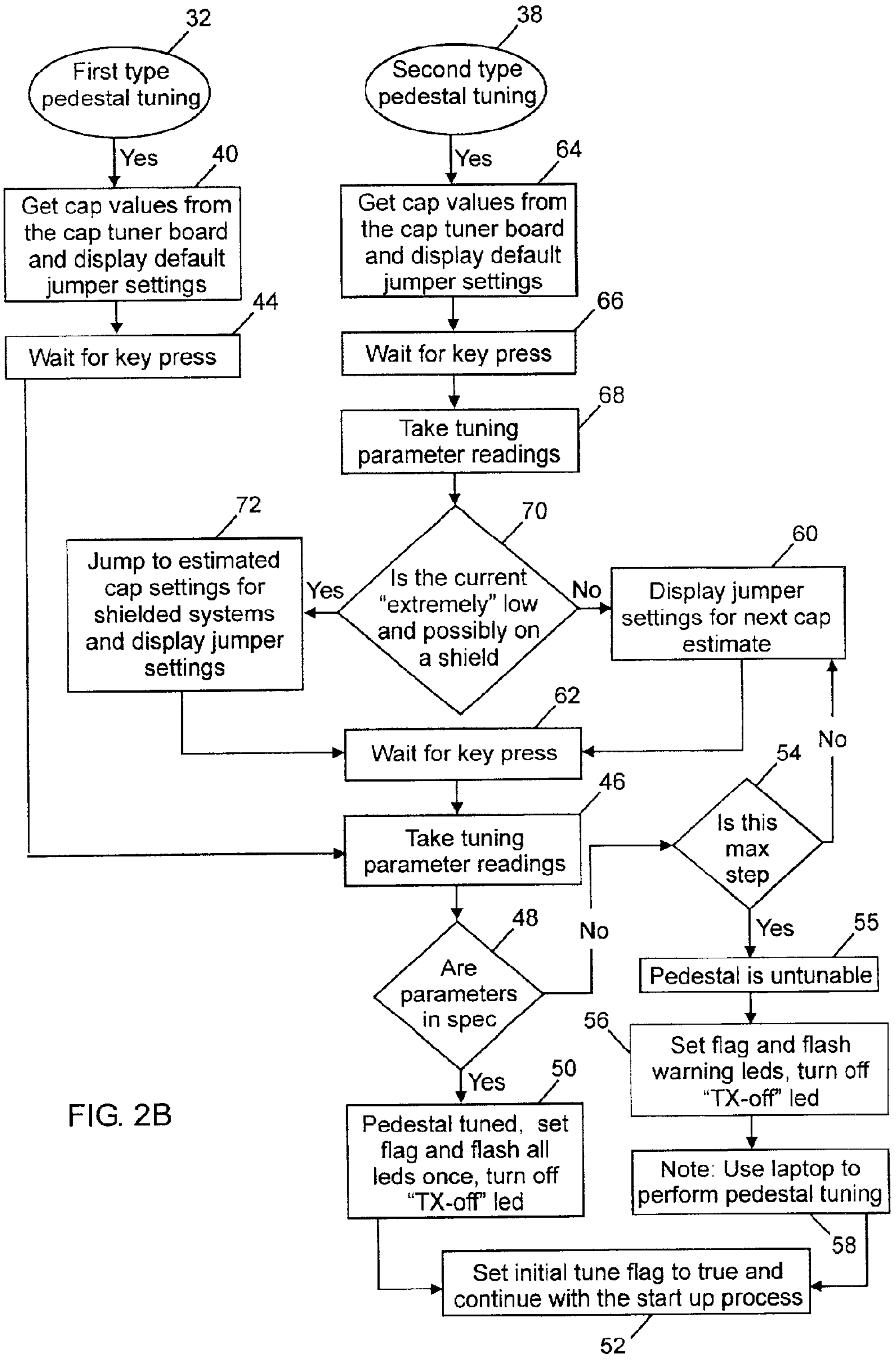

Referring to FIG. 2B, once it is determined that the antenna is not resonating at the desired frequency, as described above, and that the pedestal is a first type at 32, a capacitor/LED table setting is uploaded from the antenna and the default jumper setting are displayed at 40. The table contains the values of the capacitors for the capacitor tuning PCB associated with various jumper settings. A sample table is illustrated in FIG. 3 and includes the capacitor values in column 41, and the jumper settings in columns 42 and 43, which are associate with a preselected configuration on the capacitor tuning PCB. Returning to FIG. 2B, once the jumper settings are displayed at 40, the installer must manually place the jumpers in the correct location on the capacitor tuning PCB as indicated by lighted LEDs, and signals the system to proceed at 44. Tuning parameter readings for the current are then taken at 46, and if they are within specification at 48 the pedestal is considered tuned and an appropriate signal and flag are set at 50. The system startup is continued at 52 and an initial tune flag can be set to indicate that the pedestal has been tuned. If the tuning parameters are not within specification at 48 and if this is the maximum iteration selected at 54, the pedestal is deemed untunable at 55 and an appropriate signal can be generated at 56. The pedestal must be externally tuned at 58. If the maximum iteration has not been reached at 64, the next capacitor jumper values are displayed at 60. The installer changes the jumper settings to the newly displayed LEDs and signals the system to continue at 62.

If the second type of pedestal is to be tuned at 38, a table of capacitor/LED settings is uploaded from the antenna of the second type and the default jumper setting are displayed at 64. The installer manually places the jumpers in the correct location on the capacitor tuning PCB according to the lighted LEDs and signals the system to proceed at 66. Tuner parameter readings are taken at 68 and if the current is extremely low at 70 an alternate capacitor/LED table for shielded antennas is selected at 72, and the remainder of the process occurs as described above. The alternate capacitor/LED table is an optional table for pedestals that can be configured with shielded or unshielded antennas.

In one embodiment, the present invention will transmit at a plurality of frequencies, 15 for example, to determine which frequency contains the peak current amplitude. The resultant value will be the frequency that closely matches the current resonance point of the antenna. A calculation will be performed to determine how much capacitance must be added or subtracted to move the resonance point to the desired resonance, say 58 kHz. The new capacitance value will be looked up in the capacitor/LED table, as shown in FIG. 3, for the closest matching value. Once the capacitor value is determined, the required jumper settings for that particular capacitor tuning board will be calculated and sent to the capacitor tuning PCB. The specified LEDs will then be lit indicating to the user which jumper to place in the "in" position and which jumper to place in the "out" position. When the user has completed placing the jumper in the specified position the user signals the system, such as by depressing a button, which causes the measurements to be repeated. This process is repeated until the antenna has been tuned to the desired frequency of 58 kHz, in the example.

Figure 4:
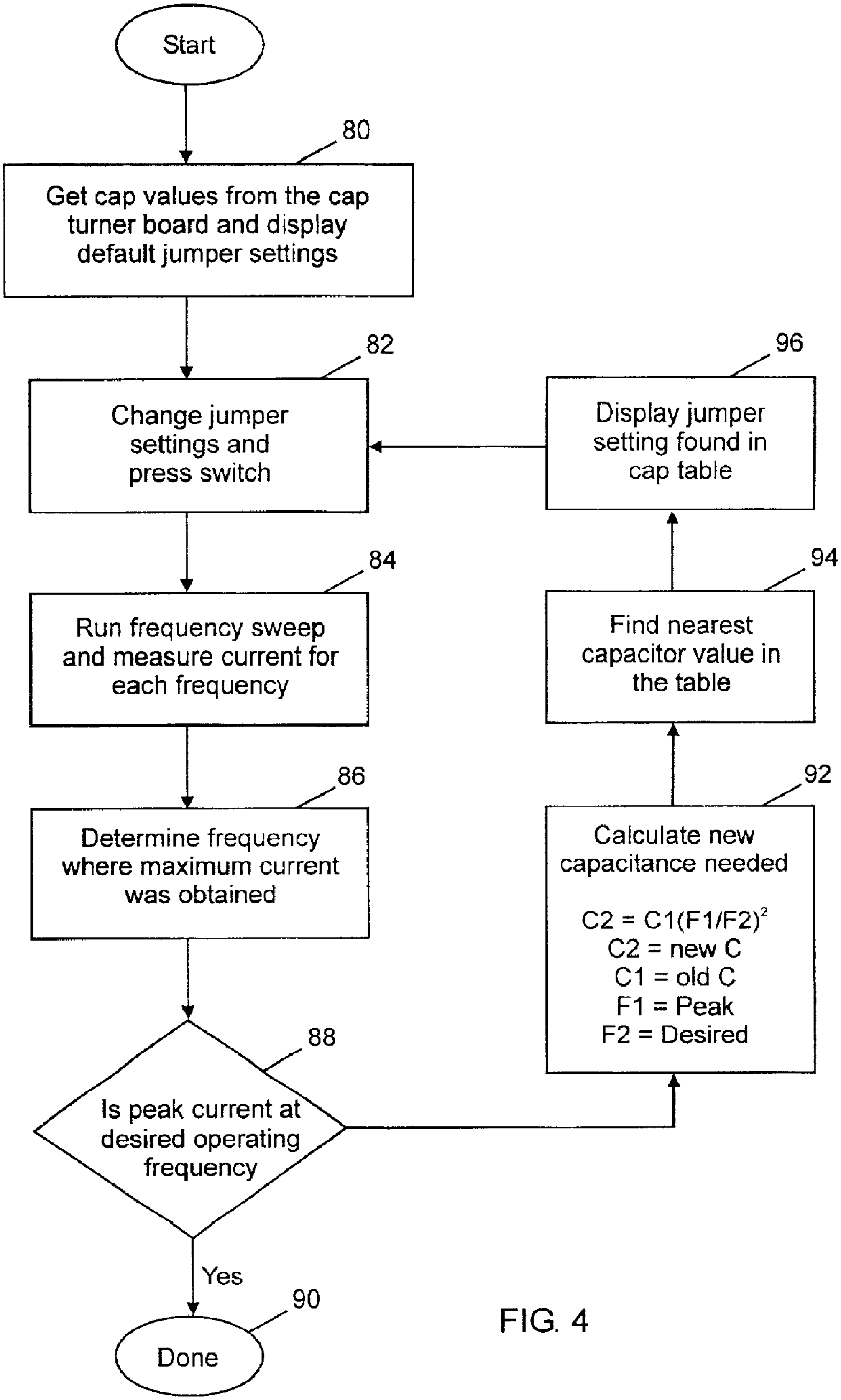
FIG. 4 is a flow diagram of one embodiment for antenna tuning of the present invention.

Referring to FIG. 4, the systems starts and uploads the first capacitor/LED settings table from the antenna and displays the jumper selections by lighting the appropriate LEDs at 80. The user installs the jumpers according to the LEDs at 82. A frequency sweep is started at 84 and the current measured at each frequency. There must be sufficient frequencies in the sweep in order to determine a peak, 15 is selected as a useable example. More frequencies will move you through the look-up table faster. If the frequencies are too close together noise may give false peak readings. Frequencies too far apart may not allow the peak to be determined. Practical frequencies are listed below for a 58 kHz system:

66000 Hz

63000 Hz

61000 Hz
60000 Hz
59000 Hz
58500 Hz
58200 Hz
58000 Hz <Center frequency>
57800 Hz
57500 Hz
57000 Hz
56000 Hz
55000 Hz
54000 Hz
53000 Hz The frequency where the maximum current was obtained is determined at 86. If the peak is at the desired frequency at 88, then the pedestal is considered tuned and the process is completed at 90. If the peak is not at the desired frequency a new capacitor value is calculated at 92. The nearest value to the calculated capacitance value is looked up in the capacitor/LED table at 94, and the new jumper setting corresponding to the new capacitor value is displayed on the capacitor tuning PCB at 96 and the process repeats.

The formula used to calculate the new capacitance value at 92 is $$C2=C1(F1/F2)^2,$$

where C2 is the new capacitor value which is used to look up the jumper settings in the capacitor table;

C1 is the capacitor value from the last calculation; (The first calculation uses a default value.)

F1 is the peak frequency found in the frequency sweep measurement.

F2 is the desired frequency.

Referring back to FIG. 3, the calculated capacitor value C2 from above is used in column 41 in the table to select a jumper setting. The measurement and jumper selection is iterated until the antenna is tuned to, in this example, 58 kHz. The actual table values will be associated with a specific antenna and the configuration of jumpers on the capacitor tuning PCB.

Instead of measuring the peak current, an alternate method of determining the amount of capacitance required to tune the antenna is to measure both the current and the voltage of the antenna waveform and calculate the phase angle. A positive phase angle will indicate that more capacitance is required and a negative phase angle will indicate less capacitance is needed. The new capacitor value will then be used as described above to tune the antenna by sending the required jumper settings to the capacitor tuning PCB.

In an alternate embodiment, the placement of jumpers could be totally automated. Instead of displaying a jumper setting by lighting LEDs, the appropriate capacitance could be automatically switched into the circuit. Furthermore, in certain installations that may not include a capacitor tuning PCB equipped with LEDs, a laptop computer or other display device could be used to indicate which jumper settings are to be changed to tune the pedestal. Thus, systems having conventional capacitor tuning PCBs can be tuned without having to upgrade the PCBs.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the forgoing disclosure.

What is claimed is:

1. A method of selecting the proper matching capacitance for maximizing power transfer into an electronic article surveillance antenna, comprising:

getting a plurality of capacitor values associated with an antenna pedestal;

selecting an initial capacitor value from the capacitor values associated with the antenna pedestal;

measuring a current at a preselected number of frequencies near a preselected operating frequency to obtain a current maximum for the antenna pedestal, if said current maximum is at said preselected operating frequency then stop, the antenna pedestal is tuned; otherwise, calculating a new capacitor value from the capacitor values associated with the antenna pedestal to tune the antenna pedestal; and, selecting the new capacitor value and jumping to the current measuring step to repeat the process until the current maximum occurs at the preselected operating frequency.

2. The method of claim 1 wherein selecting the initial and new capacitor values from the capacitor values associated with the antenna pedestal includes lighting an LED associated with a jumper setting on a capacitor tuning printed circuit board to manually select the capacitor value used in the current measuring step.

3. The method of claim 1 wherein selecting the initial and new capacitor values from the capacitor values associated with the antenna pedestal includes electronically selecting the initial and new capacitor values for the current measuring step.

4. The method of claim 1 wherein selecting the initial and new capacitor values from the capacitor values associated with the antenna pedestal includes displaying the initial and new capacitor values for the current measuring step on a remote device.

5. The method of claim 1 wherein calculating a new capacitance value from the capacitor values associated with the antenna pedestal to tune the antenna pedestal includes the formula $C2=C1(F1/F2)^2$, where C2 is the new capacitor value;

C1 is the capacitor value from the last calculation;

F1 is the peak frequency found in the preselected number of frequencies;

F2 is the preselected operating frequency.

6. The method of claim 1 further comprising:

determining if said antenna pedestal is a first type or a second type and getting the plurality of capacitance values includes capacitance values associated with the first type or second type antenna pedestal accordingly.

7. A system for selecting the proper matching capacitance for maximizing power transfer into an electronic article surveillance antenna, comprising:

means for getting a plurality of capacitor values associated with an antenna pedestal;

means for selecting an initial capacitor value from the capacitor values associated with the antenna pedestal;

means for measuring a current at a preselected number of frequencies near a preselected operating frequency to obtain a current maximum for the antenna pedestal, if said current maximum is at said preselected operating frequency then stop, the antenna pedestal is tuned; otherwise, means for calculating a new capacitor value from the capacitor values associated with the antenna pedestal to tune the antenna pedestal; and, means for selecting the new capacitor value and jumping to the current measuring step to repeat the process until the current maximum occurs at the preselected operating frequency.

8. The system of claim 7 wherein said means for selecting the initial and new capacitor values from the capacitor values associated with the antenna pedestal includes means for lighting an LED associated with a jumper setting on a capacitor tuning printed circuit board to manually select the capacitor value used in the current measuring step.

9. The system of claim 7 wherein said means for selecting the initial and new capacitor values from the capacitor values associated with the antenna pedestal includes means for electronically selecting the initial and new capacitor values for the current measuring step.

10. The system of claim 7 wherein said means for selecting the initial and new capacitor values from the capacitor values associated with the antenna pedestal includes means for displaying the initial and new capacitor values for the current measuring step on a remote device.

11. The system of claim 7 wherein said means for calculating a new capacitance value from the capacitor values associated with the antenna pedestal to tune the antenna pedestal includes the formula $C2=C1(F1/F2)^2$, where C2 is the new capacitor value;

C1 is the capacitor value from the last calculation;

F1 is the peak frequency found in the preselected number of frequencies;

F2 is the preselected operating frequency.

12. The system of claim 7 further comprising:

means for determining if said antenna pedestal is a first type or a second type and means for getting the plurality of capacitance values includes capacitance values associated with the first type or second type antenna pedestal accordingly.

* * * * *